Patented May 23, 1950

2,508,415

UNITED STATES PATENT OFFICE 2,508,415

METHOD OF MAKING 4,5-DIHYDRO-IMIDAZOLES

Henry L. Morrill, Clayton, Mo., assignor to Monsanto Chemical Company, St. Louis, Mo., a corporation of Delaware No Drawing. Application February 13, 1946, Serial No. 647,429

14 Claims. (Cl. 260—309.6)

This invention relates to a method of preparing 4,5-dihydroimidazoles and in particular 4,5-dihydroimidazoles substituted in the 2-position.

The preparation of 4,5-dihydroimidazoles using monocarboxylic acid esters and ethylenediamine according to the literature requires a number of operations. The first operation is the acylation of ethylenediamine to form a monoamide, using, for example, the methyl or ethyl ester of the desired acid as the acylating agent. The amide, after separation from excess ethylenediamine and the alcohol formed in the reaction is thereafter cyclized in a separate operation by treatment with lime for 12 to 18 hours at a temperature in the range of approximately 220–230° C. The 4,5-dihydroimidazole thus formed is separated from the lime by extraction with anhydrous methanol or ethanol. The extract is subsequently distilled to remove the solvent and the 4,5-dihydroimidazole is thereafter recovered by distillation. Besides requiring a number of operations, the process described in the literature leaves much to be desired in the yield of the 4,5-dihydroimidazole and in the efficiency of the operation from the standpoint of the proportions of starting materials employed in the reaction and the large number of operations involved.

One of the objects of the present invention is to provide an improved process for making 4,5-dihydroimidazoles whereby the transition from ethylenediamine to 4,5-dihydroimidazole is accomplished in one operation.

A further object is to provide an improved process of making 4,5-dihydroimidazoles whereby the mono-acylation of ethylenediamine and the cyclization of the monoamide are accomplished in one operation to provide a reaction mixture from which the 4,5-dihydroimidazole may be recovered by fractional distillation.

Other objects will become apparent from the following description and examples.

I have discovered that when methyl or ethyl esters of monocarboxylic organic acids of higher molecular weight than acetic acid are refluxed with anhydrous ethylenediamine, or ethylenediamine containing not more than approximately 10% of water, with removal of the methyl or ethyl alcohol as formed, the mono-acylation of ethylenediamine and the subsequent cyclization of the monoamide can both be accomplished in a single operation and the 4,5-dihydroimidazole may be recovered directly from the reaction mixture by fractional distillation after stripping off residual ethylenediamine. The yield of the desired product by the process of my invention is very satisfactory and in many instances is substantially better than the yields obtainable by the processes described in the literature.

The apparatus employed in practicing the process of the present invention may desirably consist of a reaction vessel, equipped with suitable heating means, for example a steam jacket, a 6-plate column equipped with a total condensation stillhead and a controlled take-over. Any suitable variations of this apparatus may be employed. The removal of the alcohol formed in the process of the present invention may be accomplished continuously, for example by taking forward alcohol from the column as the alcohol is formed. The alcohol removal may also be accomplished intermittently during the course of the reaction, for example by allowing the alcohol formed to accumulate in the refluxing vapors, periodically taking forward the alcohol formed and thereafter repeating this cycle, all during the course of reaction.

In place of the methyl or ethyl esters, the esters of higher alcohols may be employed, for example isopropyl, normal propyl, secondary butyl, tertiary butyl or tertiary amyl alcohols. It is essential in the process of the present invention that the alcohol formed during the reaction be removed during the course of the reaction and desirably at the time it is formed. Consequently, it is necessary that a sufficiently wide difference between the boiling point of the alcohol and the boiling point of ethylenediamine be established. For that reason, the ester employed is desirably selected from among those derived from an alcohol having a boiling point of at least 15–16° C. lower than the boiling point of ethylenediamine, i. e. below approximately 102° C. I have found the use of the methyl esters desirable for purposes of economy, although the ethyl, isopropyl, normal propyl, secondary butyl, tertiary butyl or tertiary amyl may also be employed, since these alcohols boil at a point substantially below approximately 102° C.

I have found that by using anhydrous ethylenediamine both the formation of the monoamide and the subsequent cyclization of the amide may be accomplished in a single operation. I have further found that ethylenediamine containing up to approximately 10% of water may be employed in place of anhydrous ethylenediamine provided that sufficient ethylenediamine is employed to sequester the water initially present as the monohydrate of ethylenediamine and thereby in effect isolate the water from the desired reaction mixture. Moreover, it is necessary to provide sufficient non-hydrated ethylenediamine available to sequester as the monohydrate the water formed in the cyclization reaction. It is further desirable to provide an excess of ethylenediamine beyond these requirements to avoid forming excessive quantities of side reaction products such as the diamide of ethylenediamine.

The ethylenediamine recovered from the reaction mixture can be dehydrated to a water content of 10% or less, but still containing some water, at relatively low cost, for example by adding caustic soda to the recovered ethylenediamine to salt out the water. Ethylenediamine thus recovered and partially dehydrated can be employed in subsequent batches of 4,5-dihydroimidazoles by the process of my invention at a substantially lower cost than would be the case if the ethylenediamine had to be rendered anhydrous before re-use. I have found that the presence of substantially more than 10% of water in the ethylenediamine employed gives rise to the need for excessively large quantities of ethylenediamine to provide sufficient ethylenediamine to sequester as the monohydrate the larger amounts of water. However, I have found that it is economically feasible to operate the process of the present invention with ethylenediamine containing up to approximately 10% of water. The ratio of ethylenediamine to ester, based on anhydrous ethylenediamine, in the initial reaction mixture may range from slightly more than 2:1 when anhydrous ethylenediamine is employed to 8:1 or even higher. A desirable range for those instances in which the water content of the ethylenediamine is not above approximately 10% may be 3:1 to 6:1, provided however that the ratio in the initial mixture of reactants is selected to provide sufficient ethylenediamine available for hydration by the water formed in the cyclization of the monoamide. The ratio will vary according to the water content of the ethylenediamine and the proportion of side reaction products formed in each particular instance.

The ester employed in the process of the present invention may be selected from among those derived from the condensation of an alcohol having a boiling point below approximately 102° C. with a monocarboxylic acid having a molecular weight above that of acetic acid. For example, the acid may be an acyclic, cyclic or heterocyclic monocarboxylic acid, including aliphatic, olefinic, cyclo-aliphatic, aryl-aliphatic, aryloxy-aliphatic, heterocyclic-aliphatic, aryl or heterocyclic monocarboxylic acids and ring halogen-substituted derivatives thereof. Illustrative of the monocarboxylic acids suitable for the purpose of the present invention are propionic, butyric, valeric, hexanoic, decanoic, dodecanoic, tridecanoic, tetradecanoic, pentadecanoic, 4-phenylbutyric, 4-cyclohexylbutyric, p-chlorophenylacetic, di-chlorophenylpropionic, phenylacetic, cinnamic, naphthaleneacetic, pyridineacetic, benzoic, nicotinic, oleic and linoleic acids.

The following examples will serve to illustrate the novel process of my invention. These examples are to be construed merely as illustrative and not as limiting the invention.

Example I

A mixture of 592 g. of anhydrous ethylenediamine and 427.7 g. of methyl caproate (3-1 mole ration) was refluxed under a 6-plate column equipped with a total condensation stillhead and a controlled take-over. Methyl alcohol formed during the reaction was slowly distilled forward and was taken over at the rate at which it was formed. The reaction mixture was heated in this manner for 13 hours, or until the evolution of methyl alcohol vapors had ceased. The vapors of methyl alcohol were condensed and recovered as a useful material. Residual unreacted ethylenediamine was stripped from the reaction mixture by fractional distillation. Thereafter 2-amyl-4,5-dihydroimidazole was fractionally distilled from the reaction mixture. Yield, 261.3 g. (56.8%). Melting point 53–54.6° C. A high boiling fraction (31.4 g.) was thereafter recovered from the reaction mixture, B. P. 158°/34 mm.—225°/9 mm. The residue remaining in the flask weighed 123.7 g.

Example II

A mixture of 400 g. of anhydrous ethylenediamine and 350 g. of methyl caprylate was refluxed for 10 hours under a 6-plate column equipped with a total condensation stillhead and a controlled take-over. Methyl alcohol formed during the reaction was removed according to the procedure described in Example I. The product recovered from the reaction mixture by the procedure of Example I was 2-heptyl-4,5-dihydroimidazole. Yield, 224.8 g. (60.6%).

Example III

A mixture of 340 g. of anhydrous ethylenediamine and 351 g. of methyl caprate was refluxed for 15 hours under a 6-plate column equipped with a total condensation stillhead and a controlled take-over, using the procedure described in Example I. The product recovered by the procedure described in Example I was 2-nonyl-4,5-dihydroimidazole. Yield, 223.7 g. (60.4%).

Example IV

A mixture of 1213.5 g. of anhydrous ethylenediamine and 926.3 g. of ethyl laurate was refluxed for 21.5 hours according to the procedure described in Example I. The product recovered from the reaction mixture by the procedure of Example I was 2-undecyl-4,5-dihydroimidazole. Yield, 593.8 g. (65.4%).

Example V

A mixture of 218 g. of anhydrous ethylenediamine and 198 g. of ethyl tridecanoate was refluxed for 15 hours under the conditions described in Example I. The product recovered from the reaction mixture was 2-dodecyl-4,5-dihydroimidazole. Yield, 130 g. (67%).

Example VI

A mixture of 742 g. of ethylenediamine containing 2.8% water and 970 g. of methyl myristate was refluxed for 16 hours under a 6-plate column equipped with a total condensation stillhead and a controlled take-over. The procedure employed was that described in Example I. The product recovered from the reaction mixture was 2-tridecyl-4,5-dihydroimidazole. Yield, 657.5 g. (65.1%).

Example VII

A mixture of 150 g. of anhydrous ethylenediamine and 82 g. of methyl 4-phenylbutyrate was refluxed for 10 hours and processed according to the procedure described in Example I. The product recovered from the reaction mixture was 2-(3'-phenylpropyl)-4,5-dihydroimidazole. Yield, 61.7 g. (71%).

Example VIII

A mixture of 180 g. of ethylenediamine containing 10% water and 94 g. of methyl 4-cyclohexylbutyrate was refluxed for 19 hours under the conditions described in Example I. The product recovered from the reaction mixture by the procedure of Example I was 2-(3'-cyclohexylpropyl)-4,5-dihydroimidazole. Yield, 72.3 g. (73%).

Example IX

A mixture of 205 g. of anhydrous ethylenediamine and 128 g. of methyl phenylacetate was refluxed for 15 hours under the conditions described in Example I. The product recovered from the reaction by the procedure of Example I was 2-benzyl-4,5-dihydroimidazole. Yield, 85.3 g. (62.6%).

Example X

A mixture of 3 moles of anhydrous ethylenediamine and 1 mole of ethyl cinnamate was refluxed for 15 hours under the conditions described in Example I. The product recovered from the reaction mixture by the procedure of Example I was 2-($\beta$-styryl)-4,5-dihydroimidazole.

Example XI

A mixture of 3 moles of anhydrous ethylenediamine and 1 mole of ethyl benzoate was refluxed for 15 hours under the conditions described in Example I. The product recovered from the reaction mixture was 2-phenyl-4,5-dihydroimidazole.

Example XII

A mixture of 3 moles of anhydrous ethylenediamine and 1 mole of ethyl oleate was refluxed for 15 hours under the conditions described in Example I. The product recovered by the procedure described in Example I was 2-(8'-heptadecenyl)-4,5-dihydroimidazole.

Example XIII

A mixture of 3 moles of anhydrous ethylenediamine and 1 mole of ethyl nicotinate was refluxed for 15 hours under the conditions described in Example I. The product recovered by the procedure of Example I was 2-(3'-pyridyl)-4,5-dihydroimidazole.

The foregoing examples are to be construed as being merely illustrative of the process of the present invention and it is to be understood that other esters of the monocarboxylic acids described therein as well as esters of other monocarboxylic acids may also be employed in the process of my invention. It is also to be understood that my invention is not to be limited to the particular conditions described in the aforescribed examples but that various modifications and alternatives may be practiced which provide essentially the reaction conditions described hereinabove for the accomplishment of the cyclization of the ethylenediamine derivative formed in situ and that these variations and modifications are contemplated as being within the scope of the present invention.

I claim:

1. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

2. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of ethylenediamine containing less than approximately 10% of water, continuously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

3. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of ethylenediamine containing less than approximately 10% of water, intermittently fractionally distilling off the alcohol formed during the course of the reaction until formation of the alcohol in the reaction mixture ceases, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

4. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of ethylenediamine containing less than approximately 10% of water, the ratio of ethylenediamine to ester in the initial reaction mixture being in the range of 3:1 to 6:1, provided further that the ratio of ethylenediamine to ester in the reaction mixture initially is selected to provide sufficient ethylenediamine available for chemical hydration by the water evolved during the cyclization of the monoamide, simultaneously fractionally distilling off the alcohol formed during the course of the reaction, thereafter removing residual ethylenediamine from the reaction mixture and subsequently recovering the 4,5-dihydroimidazole from the reaction mixture.

5. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of ethylenediamine containing less than approximately 10% of water, the ratio of ethylenediamine to ester in the initial reaction mixture being in the range of 2:1 to 8:1, provided further that the ratio of ethylenediamine to ester in the reaction mixture initially is selected to provide sufficient ethylenediamine available for chemical hydration by the water evolved during the cyclization of the monoamide, simultaneously fractionally distilling off the alcohol formed during the course of the reaction, thereafter removing residual ethylenediamine from the reaction mixture and subsequently recovering the 4,5-dihydroimidazole from the reaction mixture.

6. A process of preparing 4,5-dihydroimidazoles consisting of heating an ester formed by the esterification of a monocarboxylic acid having a molecular weight greater than 60 and a monohydric alcohol having a boiling point below approximately 102° C. with an excess of anhydrous ethylenediamine, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

7. A process of preparing 4,5-dihydroimidazoles consisting of heating an ester formed by the esterification of an acyclic monocarboxylic acid having a molecular weight greater than 60 and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

8. A process of preparing 4,5-dihydroimidazoles consisting of heating an ester formed by the esterification of a cyclic monocarboxylic acid and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

9. A process of preparing 4,5-dihydroimidazoles consisting of heating an ester formed by the esterification of an aliphatic monocarboxylic acid having a molecular weight greater than 60 and a monohydric alcohol having a boiling point below approximately 102° C. with an excess of ethylenediamine containing less than approximately 10% of water, simultaneously fractionally distilling off the alcohol fromed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

10. A process of preparing 4,5-dihydroimidazoles consisting of heating an ester formed by the esterification of an aryl-aliphatic monocarboxylic acid and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

11. A process of preparing 2-undecyl-4,5-dihydroimidazole consisting of heating an ester formed by the esterification of lauric acid and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering 2-undecyl-4,5-dihydroimidazole from the reaction mixture, the ratio of ethylenediamine to ester in the reaction mixture initially being selected to provide sufficient ethylenediamine available for chemical hydration by water evolved during the cyclization of the monoamide.

12. A process of preparing 2-(8'-heptadecenyl)-4,5-dihydroimidazole consisting of heating an ester formed by the esterification of oleic acid and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently decovering the 2-(8'-heptadecennyl)-4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

13. A process of preparing 2-benzyl-4,5-dihydroimidazole consisting of heating an ester formed by the esterification of phenylacetic acid and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 2-benzyl-4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

14. A process of preparing 4,5-dihydroimidazoles comprising heating in the absence of an added dehydrating agent, an ester formed by the esterification of a monocarboxylic acid having a molecular weight greater than 60 and a monohydric alcohol having a boiling point below approximately 102° C. with an excess of ethylenediamine containing less than approximately 10% of water, simultaneously fractionally distilling off the alcohol formed during the course of the reaction, thereafter removing residual ethylenediamine from the reaction mixture and subsequently recovering the 4,5-dihydroimidazole from the reaction mixture, the ratio of ethylenediamine to ester in the reaction mixture initially being selected to provide sufficient ethylenediamine available for chemical hydration by the water evolved during the cyclization of the monoamide.

HENRY L. MORRILL.

REFERENCES CITED

The following references are of record in the file of this patent:

UNITED STATES PATENTS

| Number | Name | Date |
|---|---|---|
| 2,267,965 | Wilson | Dec. 30, 1941 |
| 2,418,077 | Kyrides | Mar. 25, 1947 |